(12) United States Patent
Cook

(10) Patent No.: US 7,637,665 B2
(45) Date of Patent: Dec. 29, 2009

(54) BEARING ASSEMBLY AND RESILIENT SEAL ELEMENT

(75) Inventor: John Cook, Naperville, IL (US)

(73) Assignee: Emerson Power Transmission Corporation, Florence, KY (US)

( * ) Notice: Subject to any disclaimer, the term of this patent is extended or adjusted under 35 U.S.C. 154(b) by 334 days.

(21) Appl. No.: 11/480,212

(22) Filed: Jun. 30, 2006

(65) Prior Publication Data

US 2008/0002925 A1    Jan. 3, 2008

(51) Int. Cl.
    *F16C 33/76* (2006.01)
    *F16J 15/32* (2006.01)
(52) U.S. Cl. .................. 384/477; 384/537; 384/484; 277/351; 277/353
(58) Field of Classification Search ......... 384/477–478, 384/482, 486, 537–538, 541; 277/307, 349, 277/353, 377, 351
    See application file for complete search history.

(56) References Cited

U.S. PATENT DOCUMENTS

| | | | | |
|---|---|---|---|---|
| 2,405,122 A * | 8/1946 | Firth ........................... 384/477 |
| 4,113,328 A | 9/1978 | Meulen |
| 4,484,752 A * | 11/1984 | Bentley ....................... 277/377 |
| 4,537,519 A * | 8/1985 | LaRou et al. ................ 384/478 |
| 4,669,895 A * | 6/1987 | Colanzi et al. ............... 384/477 |
| 4,728,202 A * | 3/1988 | LaRou ........................ 384/537 |
| 4,792,242 A * | 12/1988 | Colanzi et al. ............... 384/482 |
| 4,799,808 A * | 1/1989 | Otto ............................ 277/349 |
| 5,002,406 A * | 3/1991 | Morton et al. ............... 384/477 |
| 5,042,822 A * | 8/1991 | Dreschmann et al. ....... 277/353 |
| 5,147,139 A * | 9/1992 | Lederman .................... 384/477 |
| 5,419,642 A * | 5/1995 | McLarty ...................... 384/486 |
| 5,685,650 A * | 11/1997 | Martinie et al. ............. 384/538 |
| 5,704,719 A | 1/1998 | Cook et al. |
| 5,716,147 A | 2/1998 | Cook et al. |
| 5,863,137 A | 1/1999 | Johnson et al. |
| 5,927,864 A | 7/1999 | Feerick |
| 6,149,158 A * | 11/2000 | Tripathy ...................... 277/307 |
| 6,481,896 B1 * | 11/2002 | Ohtsuki et al. .............. 384/484 |
| 6,581,939 B1 | 6/2003 | Theros et al. |
| 6,677,283 B2 | 1/2004 | Ni |
| 6,729,765 B2 | 5/2004 | Ni et al. |
| 6,746,018 B2 | 6/2004 | Lewis et al. |
| 6,817,769 B2 | 11/2004 | Johnson et al. |
| 6,840,679 B2 * | 1/2005 | Lenick et al. ................ 384/537 |
| 6,854,893 B2 * | 2/2005 | Schmidt ...................... 384/486 |
| 6,887,520 B1 | 5/2005 | Paver et al. |
| 6,908,230 B2 | 6/2005 | Johnson et al. |
| 7,258,491 B2 * | 8/2007 | Gutowski et al. ........... 384/486 |
| 2002/0022581 A1 | 2/2002 | Ni |
| 2003/0063824 A1 * | 4/2003 | Aldridge ..................... 384/477 |
| 2004/0120621 A9 | 6/2004 | Johnson et al. |

\* cited by examiner

*Primary Examiner*—Marcus Charles
(74) *Attorney, Agent, or Firm*—Harness, Dickey & Pierce, P.L.C.

(57) ABSTRACT

A bearing assembly includes an inner race and an outer race, with the outer race positioned such that the inner race is an opposed and spaced apart relation from the outer race. Roller elements are disposed between the inner race and the outer race. A resilient seal element extends adjacent to a flange element, maintaining an effective seal during axial and/or radial movement, such as that caused by thermal expansion, of the resilient seal element relative to the flange element. The resilient seal element excludes contaminants from entering the bearing assembly and retains grease or lubricant within the bearing assembly.

31 Claims, 4 Drawing Sheets

BEARING ASSEMBLY AND RESILIENT SEAL ELEMENT

FIELD

The invention relates to a bearing assembly, and more specifically, to the sealing structures of bearing assemblies.

BACKGROUND

Various bearing assemblies are known in the art. Typical bearing assemblies include a circumferential inner race mounted on an inner component, for example, a rotating inner member such as a shaft, and an outer race positioned so that the inner race is in an opposed and spaced apart relation from the outer race. The outer race is mounted to an outer component, such as for example, a stationary member. A plurality of roller elements, such as balls, is typically disposed between the inner race and the outer race. The roller elements reduce friction and wear between the moving parts and surfaces, and the bearing assembly often contains a lubricant to further protect the roller elements and other parts by reducing friction and wear. Exemplary bearing assemblies are disclosed in U.S. Pat. No. 5,704,719 (Cook et al.), U.S. Pat. No. 5,716,147 (Cook et al.), U.S. Pat. No. 5,863,137 (Johnson et al.), U.S. Pat. No. 5,927,864 (Feerick), and U.S. Pat. No. 6,677,283 (Ni), all of which are incorporated herein by reference.

Bearing assemblies are often subjected to harsh operating environments where the bearing assemblies are exposed to liquid, gaseous, and solid contaminants. For example, bearing assemblies often encounter dirt, abrasive materials, metal particles, corrosive chemicals, and water. Contaminants that migrate into the bearing assembly interior can quickly cause damage and wear to the roller elements that can ultimately result in bearing failure.

Various sealing arrangements have been described in the art to protect bearing assemblies. A typical sealing arrangement can operate to reduce the entry of contaminants into the bearing assembly where the roller elements are located. Often sealing arrangements include rigid sealing elements that typically have one or more metallic circumferential flanges associated with the inner or outer component and are closely positioned with respect to a cooperating rigid feature of the other component. However, in many applications, bearing assemblies can encounter or generate temperature changes during operation that result in thermal expansion and/or movement between components of the bearing assembly.

Thermal expansion can result in axial and/or radial expansion, thereby causing movement of various bearing assembly components relative to each other which can change the effectiveness of a bearing assembly seal. For example, axial and/or radial expansion due to heating and/or wear of the bearing assembly and inner member can result in the creation of an overly large gap in a bearing assembly seal. Such axial and/or radial expansion can also result in bearing assembly sealing components being brought into contact with each other and to wear against each other, or to otherwise damage the seal or components. Consequently, the seal's effectiveness in excluding contaminants and/or in retaining lubricant within the bearing assembly can be compromised.

SUMMARY

The present description provides a bearing assembly. In various embodiments, the bearing assembly includes an inner race coupled to an inner member. An outer race is coupled to an outer member and positioned such that the inner race is in an opposed and spaced apart relation from the outer race. A plurality of roller elements is disposed between the inner race and the outer race. A flange element is coupled to one of the inner race and the outer race. The flange element extends generally radially toward the other one of the inner race and the outer race. A resilient seal element is coupled to the other one of the inner race and the outer race and the resilient seal extends adjacent to the flange element. The inner member and the outer member are permitted to rotate relative to each other.

Other bearing assembly embodiments include an inner race coupled to an inner member. An outer race is coupled to an outer member and positioned such that the inner race is in an opposed and spaced apart relation from the outer race. A plurality of roller elements is disposed between the inner race and the outer race. A flange element is coupled to the inner race and extends generally radially toward the outer race. A resilient seal element is coupled to the outer race and extends adjacent the flange element. The inner member and the outer member are permitted to rotate relative to each other. The resilient seal element remains adjacent to the flange element during at least one of axial movement and radial movement of the flange element relative to the resilient seal element.

Additional bearing assembly embodiments include an inner race coupled to an inner member. An outer member race is coupled to an outer member and positioned such that the inner race is in an opposed and spaced apart relation from the outer race. A flange element is coupled to the inner race and extends generally radially toward the outer race. A seal carrier is coupled to the outer race and extends generally radially toward the inner race. A resilient seal element is coupled to the seal carrier and extends adjacent to the flange element. The inner member and the outer member are permitted to rotate relative to each other. The resilient seal element remains adjacent to the flange element during thermal expansion.

Also included are bearing assembly embodiments that have an inner race coupled to an inner member. An outer race is coupled to an outer member, and positioned such that the inner race is in an opposed and spaced apart relation from the outer race. A plurality of roller elements is disposed between the inner race and outer race. A seal assembly includes a first rigid element having a snap-fit member coupling the first rigid element with a cooperating snap-fit member on either the inner or outer race. The first rigid element extends generally radially toward the other one of the inner or outer race. A resilient seal element cooperates with the first rigid member in providing a seal to protect an interior of the bearing assembly from an exterior environment.

DRAWINGS

The drawings described herein are for illustration purposes only and are not intended to limit the scope of the present disclosure in any way.

DETAILED DESCRIPTION

Figure 1:
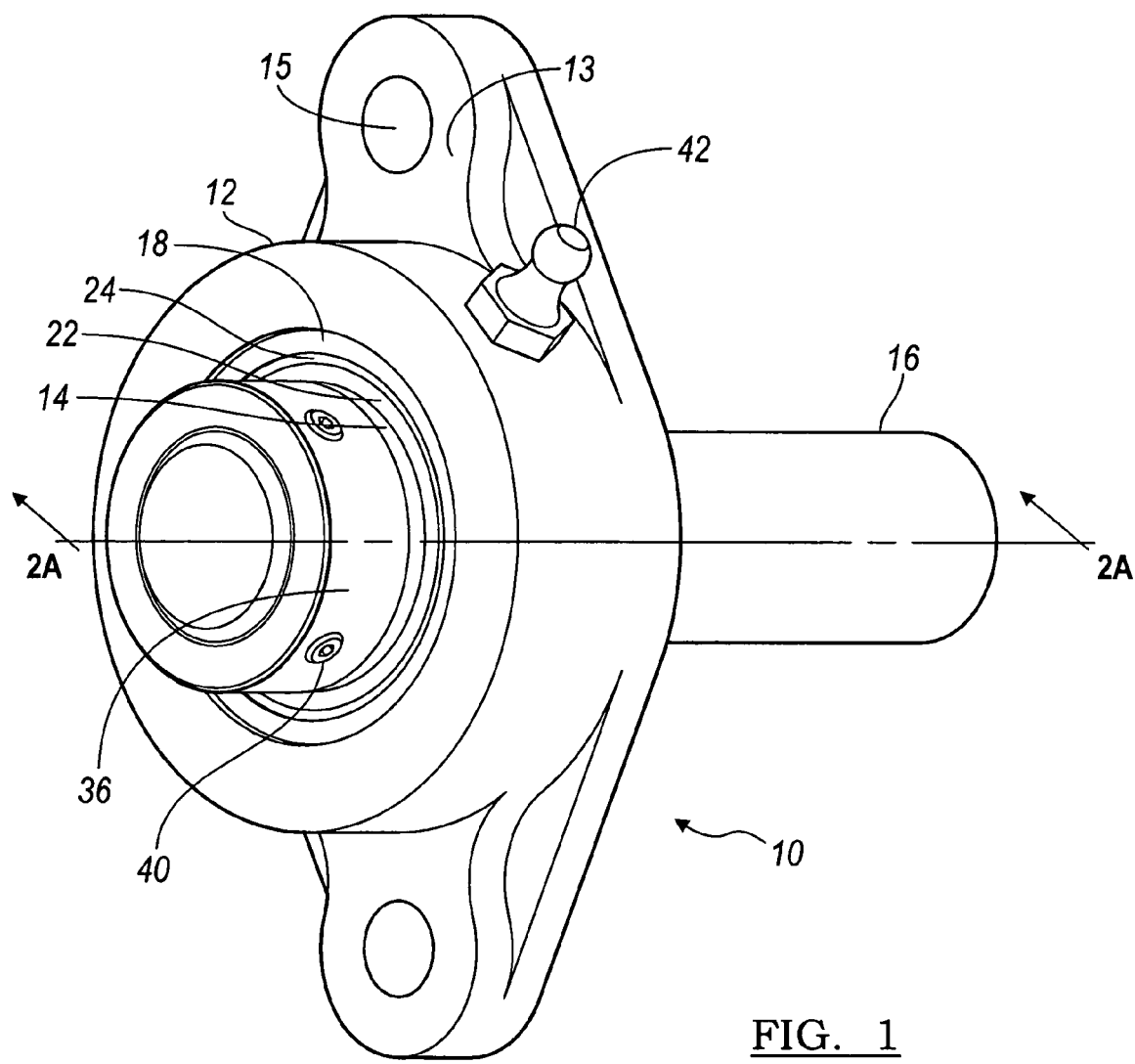
FIG. 1 is a perspective view of an embodiment of a bearing assembly and resilient seal element.

The following description is merely exemplary in nature and is not intended to limit the present disclosure, application, or uses. It should be understood that throughout the drawings, corresponding reference numerals indicate like or corresponding parts and features in the various embodiments, although the exact structural configurations of the features may be somewhat different. "A" and "an" as used herein indicate "at least one" of the item is present; a plurality of such items may be present, when possible.

Figure 2A:
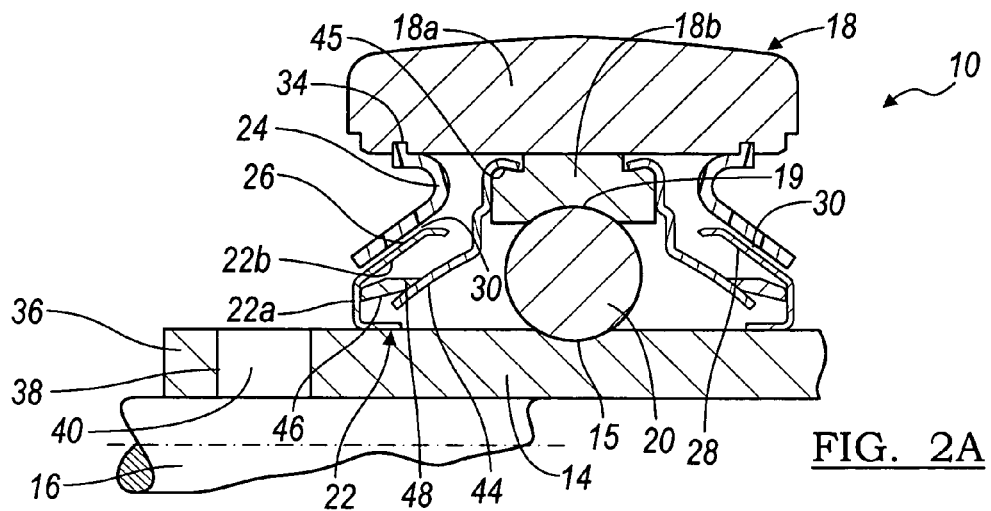
FIG. 2A is a fragmentary cross-sectional view of a bearing assembly and resilient seal element.

FIG. 1 and FIG. 2A illustrate an exemplary embodiment of a bearing assembly 10, including a resilient seal element 24, mounted on an inner member which can be a shaft 16, and retained within a housing 12. An outer member can be coupled to the bearing assembly 10, for example, by using bolts (not shown) through apertures 15 in flanges 13 of the housing 12. The bearing assembly 10 includes an inner race 14, which is mounted on the shaft 16, and an outer race 18 positioned such that a roller bearing surface 15 of the inner race 14 is in an opposed and spaced apart relation from a roller bearing surface 19 of the outer race 18. A plurality of roller elements 20 is disposed between the inner race 14 and the outer race 18. It will be appreciated that although the roller elements 20 are depicted as spherical balls in FIG. 2A, they can be any number of different types of roller elements 20, including for example, needle rollers, tapered rollers, and offset rollers. Furthermore, although only a single row of roller elements 20 is illustrated in this embodiment, there can be more than one row of roller elements 20 within the bearing assembly 10.

A rigid element, such as a flange element 22, is shown coupled directly to the inner race 14; the flange element 22 extends in a generally radial direction toward the outer race 18. Extending in this generally radial direction is a perpendicular portion 22a and an angled portion 22b. As illustrated in this embodiment, the outer race 18 (like the inner race 14) can be formed of multiple components, 18a and 18b, coupled together. A resilient seal element 24 is coupled to the outer race 18 and extends therefrom to lie adjacent to the outside 26 of flange element 22, as shown. In this embodiment, the flange element 22 and adjacent resilient seal element 24 are illustrated as being in close proximity to each other, resulting in a narrow gap 30 between the flange element 22 and resilient seal element 24, for example as shown in FIG. 2A. Alternatively, the resilient seal element 24 can contact the flange element 22, for example as shown in FIGS. 2B and 2C.

Figure 2B:
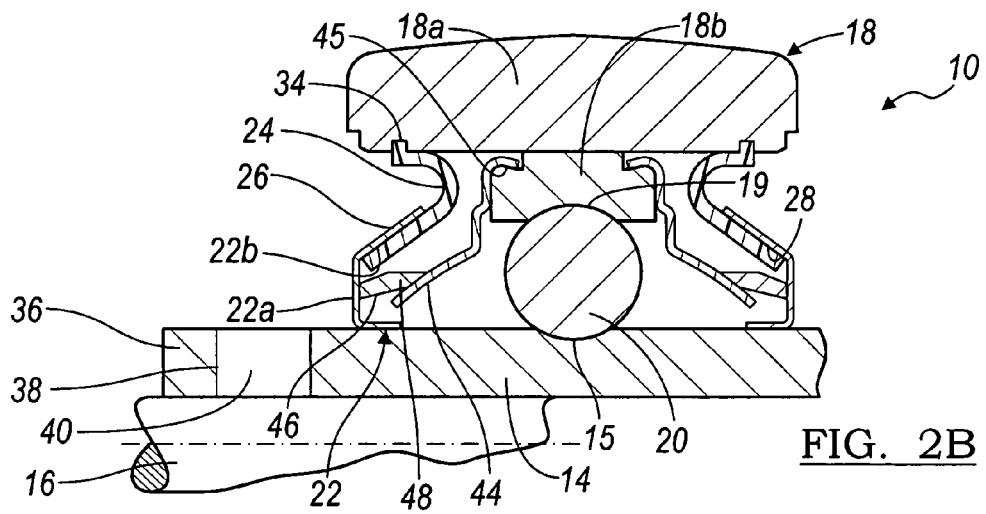
FIG. 2B is a fragmentary cross-sectional view of an alternate embodiment of a bearing assembly and resilient seal element.
Figure 2C:
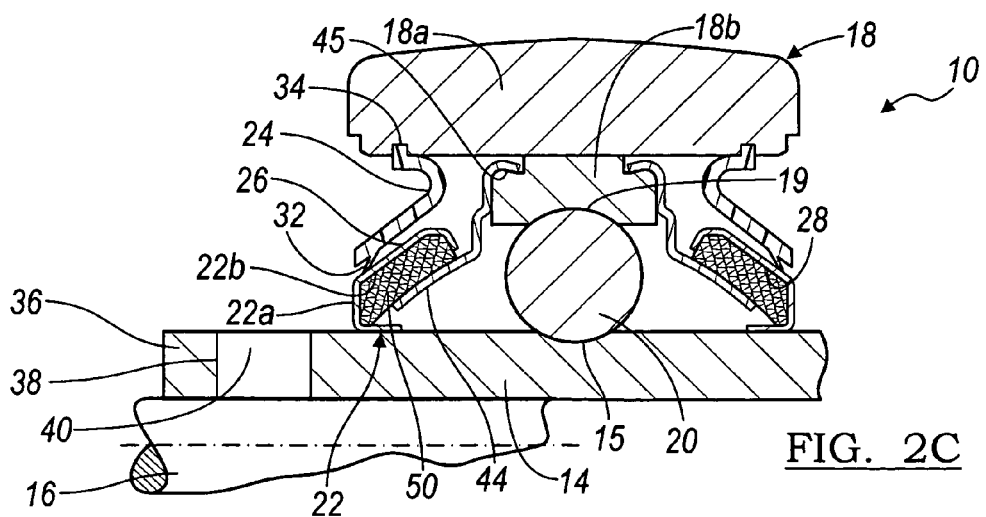
FIG. 2C is a fragmentary cross-sectional view of an alternate embodiment of a bearing assembly and resilient seal element.
Figure 3A:
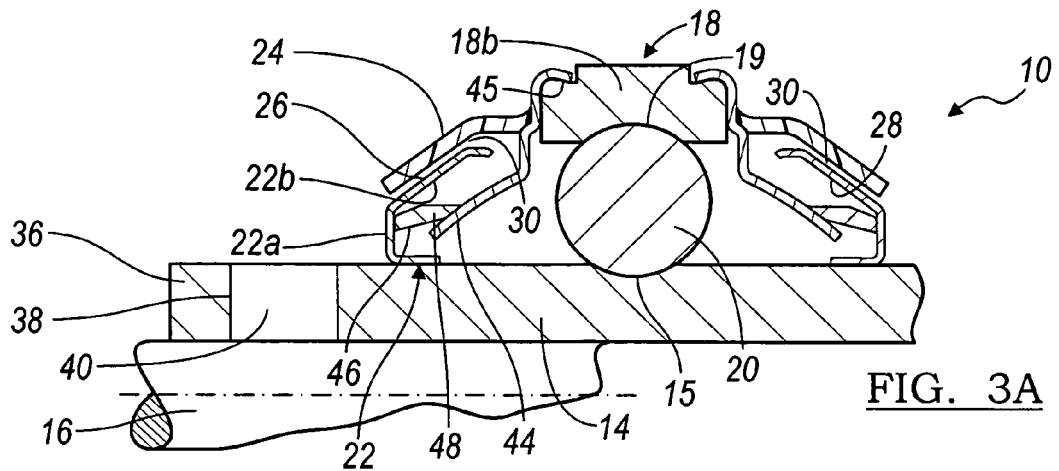
FIG. 3A is a fragmentary cross-sectional view of an alternate embodiment of a bearing assembly and resilient seal element.
Figure 3B:
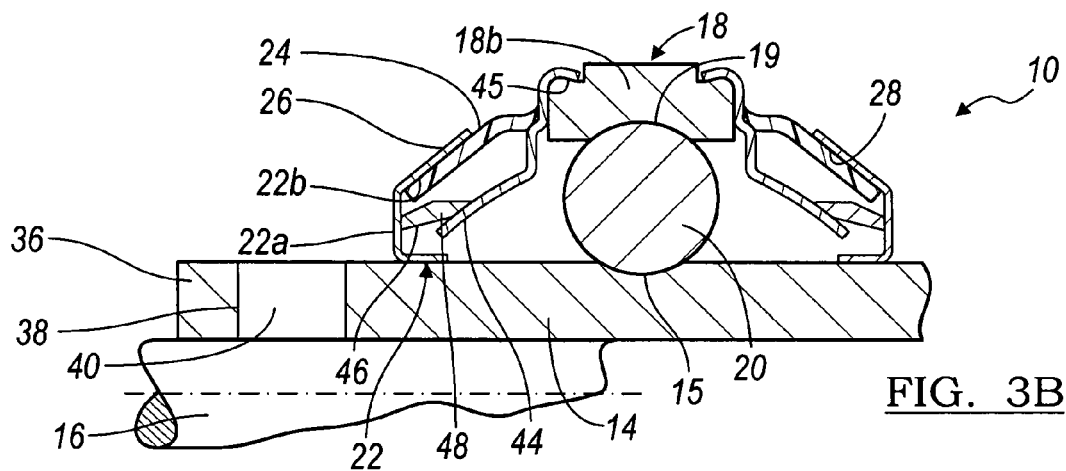
FIG. 3B is a fragmentary cross-sectional view of an alternate embodiment of a bearing assembly and resilient seal element.
Figure 3C:
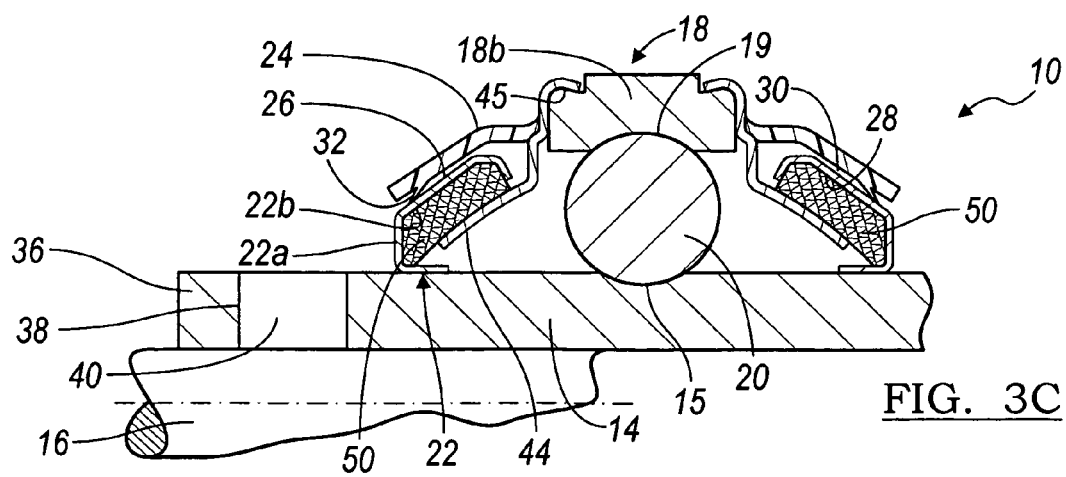
FIG. 3C is a fragmentary cross-sectional view of an alternate embodiment of a bearing assembly and resilient seal element.

The term "adjacent" in describing the relationship of the resilient seal element 24 to the flange element 22 includes embodiments having a narrow gap 30 between the resilient seal element 24 and the flange element 22 (examples include FIGS. 2A and 3A), embodiments where the resilient seal element 24 contacts the flange element 22 (examples include FIGS. 2B, 2C, 3B, and 3C), as well as embodiments where the resilient seal element 24 is outside 26 of the flange element (examples include FIGS. 2A, 2C, 3A, and 3C) or inside 28 of the flange element 22 (examples include FIGS. 2B and 3B). For instance, contact between the flange element 22 and adjacent resilient seal element 24 can be direct or via a molded lip seal 32 extending from the resilient seal element 24 as shown in FIGS. 2C and 3C. Other embodiments include bearing assemblies 10 where the resilient seal element 24 is adjacent to the flange element 22 along a substantial length of the resilient seal element 24, or where just the distal end of the resilient seal element 24 is adjacent to the flange element 22. In embodiments where the resilient seal element 24 contacts the flange element 22, the absence of a gap can create a zero clearance seal between the resilient seal element 24 and the flange element 22.

The resilient seal element 24 can be formed of various materials; typically the resilient seal element 24 can be made of polymer, rubber, or elastomeric material. Exemplary materials for the resilient seal element 24 include: nylon; polypropylene; fluoropolymer, such as TEFLON® from DuPont; fluoroelastomer, such as VITON®; nitrile; ethylene acrylic elastomer, such as VAMAC®; urethane; polyimide, such as VESPEL®; or other polymers, rubbers, elastomers, and composites thereof. Other exemplary materials, including materials amenable to ultrasonic welding, are: poly(acrylonitrile, butadiene, styrene), i.e., ABS copolymer; acrylic; butadiene-styrene; phenylene-oxide based resin; polycarbonate; polyetherimide; polyethersulfone; polystyrene; poly(vinyl chloride); acetal; cellulosic; fluoropolymer; nylon; polyester; polyetheretherketone (PEEK); polyethylene; polymethylpentene; polyphenylene sulfide; and polypropylene. Essentially any pliable material can be used as long as it is compatible with the expected operating environment of the bearing assembly 10; for example, it should be chemically and thermally stable relative to the intended application.

Wear characteristics of the material chosen for the resilient seal element 24 are also important. Typically, any contact between the resilient seal element 24 and the flange element 22 produces less wear for both the resilient seal element 24 and the flange element 22 compared to a seal element composed of a rigid material, such as metal. For example, contact between a metallic seal element and a metallic flange element 22 can quickly wear the metallic seal and metallic flange element 22 and can irreversibly damage the seal effectiveness. The pliability of the resilient seal element 24 allows it to bend if the flange element 22 contacts the resilient seal element 24. Also, the flexible and pliable character of the resilient seal element 24 allows it to accommodate movement between the resilient seal element 24 and flange element 22 while still maintaining an effective seal. In addition, the pliability of the resilient seal element 24 can allow the resilient seal element 24 to be biased against the flange element 22. Embodiments of the resilient seal element 24 can further include tapered shapes so that if the resilient seal element 24 is biased against the flange element 22, the resilient seal element 24 remains in contact with the flange element 22 as it wears.

As shown in the embodiments of FIGS. 2A-2C, the resilient seal element 24 is coupled to the outer race 18 by press-fitting into a receiving channel 34. However, the resilient seal element 24 can alternatively be coupled to the outer race 18 by various methods typically known in the art. Such coupling methods (not shown) include, but are not limited to, ultrasonic welding, adhesive bonding, or by melting the resilient seal element 24 into holes or notches formed in the outer race 18. It should be recognized that the coupling method and the choice of material for the resilient seal element 24 can be interdependent. For example, it is recognized that a polymeric resilient seal element 24 should be compatible with an adhesive used to couple the resilient seal element 24 to the outer race 18.

The bearing assembly 10 may be attached to the inner member, which can be a shaft 16, using any suitable method. One exemplary method is shown in the Figures, where the inner race 14 has an axial extension 36 with a threaded aperture 38 to receive a setscrew 40. A setscrew 40 is tightened down against the shaft 16 to secure the inner race 14 and bearing assembly 10 to the shaft 16. More than one axial extension 36 and/or setscrew 40 can be used, for example. Other attachment devices can be used to couple the shaft 16 to the bearing assembly 10, such as for example, compressible annular locking collars as described in U.S. Pat. Nos. 5,863,137 and 6,908,230, which are incorporated herein by reference in their entirety.

Lubrication of the bearing assembly 10 and resilient seal element 24 can be accomplished via a grease fitting 42. The grease fitting 42 directs grease or other lubricant through the outer race 18 to lubricate the roller elements 20. The resilient seal element 24 can help retain the grease or lubricant within the bearing assembly 10, in addition to excluding entry of outside contaminants. Moreover, any space between the flange element 22 and adjacent resilient seal element 24, such as a narrow gap 30, will tend to fill with and retain grease or lubricant upon lubrication of the bearing assembly 10.

The bearing assembly 10 and resilient seal element 24 can further include another rigid element, such as a seal carrier 44, and a cooperating flexible sealing member 46. The seal carrier 44 is shown in FIG. 2A as coupled to the outer race 18 and extending generally radially toward the inner race 14. The seal carrier 44 can be formed of metal. A flexible sealing member 46 can be coupled to the inner race 14 via the flange element 22. The flexible sealing member 46 has at least one sealing leg 48 sealingly contacting the seal carrier 44. The flexible sealing member 46 can function similar to a one-way valve which permits lubricant to move outward but limits movement of lubricant and contaminants into the bearing assembly. Alternatively (not shown), the flexible sealing member 46 can be coupled to the outer race 18 (for example, via the seal carrier 44) and sealingly contact the flange element 22 with at least one sealing leg 48. The flexible sealing member 46 can be made of materials similar to those discussed above regarding the resilient seal element 24.

The seal carrier 44 can be coupled to the outer race 18, as shown in FIGS. 2A-3C, by snap-fitting the seal carrier 44 over an inwardly angled lip 45. As illustrated in the drawings, a snap-fit is provided by including an angled end portion on the seal carrier 44 that cooperates with the inwardly angled lip 45. Thus, a component of the outer race 18b can be constructed to provide clearance for the edge of the seal carrier 44 as the seal carrier 44 is pressed over the outer race 18b and snaps into the inwardly angled lip 45 on the outer race 18b. Coupling the seal carrier 44 to the outer race 18b by snap-fitting provides a radial press fit and an axial force that pulls the seal carrier 44 against the outer race 18b, holding the seal carrier 44 in place. Of course, many alternative snap-fit arrangements could be provided as would be apparent to one skilled in the art.

Other non-limiting examples (not shown) include a bearing assembly 10 with an inner race 14, an outer race 18, a plurality of roller elements 20, and a seal assembly, where the inner race 14 and outer race 18 rotate relative to each other. The inner race 14 is coupled to an inner member and the outer race 18 is coupled to an outer member, with the races 14, 18 positioned such that the inner race 14 is in an opposed and spaced apart relation from the outer race 18. The plurality of roller elements 20 is disposed between the inner race 14 and outer race 18. The seal assembly includes a first rigid element and a resilient seal element 24. The first rigid element includes a snap-fit member coupling the first rigid element to either the inner race 14 or the outer race 18 so that the first rigid element extends generally radially toward the other one of the inner 14 or outer race 18. The resilient seal element 24 is coupled to the other one of the inner race 14 and the outer race 18 and extends adjacent to the first rigid element. The bearing assembly 10 can further include a second rigid element and the second rigid element can be coupled to the other one of the inner race 14 and the outer race 18 by snap-fitting, for example. The resilient seal element 24 can also be coupled to the other one of the inner race 14 and the outer race 18 by the second rigid element.

An alternative embodiment, shown in FIG. 2B, is substantially identical to the bearing assembly 10 of FIG. 2A, except that the flange element 22 does not bend at its distal end, and the resilient seal element 24 extends from the outer race 18 to lie adjacent to the inside 28 of the flange element 22.

In another alternate embodiment, shown in FIG. 2C, the resilient seal element 24 can contact an outer surface of the flange element 22, providing essentially no gap, or a zero clearance seal, between the resilient seal element 24 and the flange element 22. Contact can be provided by one or more molded lip seals 32 extending from the resilient seal element 24 to contact the flange element 22. One or more molded lip seals 32 can help exclude outside contaminants from entering the bearing assembly 10 and can further help retain grease or lubricant between the resilient seal element 24 and the flange element 22. Moreover, the flexible sealing member 46 can be in the form of a felt insert 50 disposed between the seal carrier 44 and the flange element 22. The felt insert can help exclude entry of contaminants and loss of lubricant, in addition to the benefits afforded by the resilient seal element 24.

Other embodiments of a bearing assembly 10 and resilient seal element 24 are shown in FIGS. 3A-C. These embodiments use the seal carrier 44 to couple the resilient seal element 24 to the outer race 18. For example, as illustrated in FIG. 3A, the resilient seal element 24 is coupled the outer race 18. This is accomplished by coupling the resilient seal element 24 directly to the seal carrier 44 which is in turn coupled directly to the outer race 18.

The resilient seal element 24 can be coupled directly to the seal carrier 44 by various methods typically known in the art. Such coupling methods include, but are not limited to, press-fitting into a receiving channel (not shown) in the seal carrier 44, ultrasonic welding, adhesive bonding, or by melting the resilient seal element 24 into holes or notches (not shown) formed in the seal carrier 44.

As shown in FIG. 3A, the resilient seal element 24 extends adjacent to the outside 26 of the flange element 22. The resilient seal element 24 forms a gap 30 with the flange element 22. FIG. 3B shows an embodiment where the resilient seal element 24 is coupled to the seal carrier 44 and extends adjacent to the inside 28 of the flange element 22, and as illustrated, directly contacts the flange element 22. Additional sealing features, such as a flexible sealing member 46 (an exemplary embodiment is shown in FIG. 3B) or a felt insert 50 (an exemplary embodiment is shown in FIG. 3C), can be included in the bearing assembly 10. FIG. 3C illustrates an embodiment where the resilient seal element 24 is coupled to the outer race 18 via the seal carrier 44, and where the resilient seal element 24 contacts the flange element 22 via a molded lip seal 32.

Figure 4:
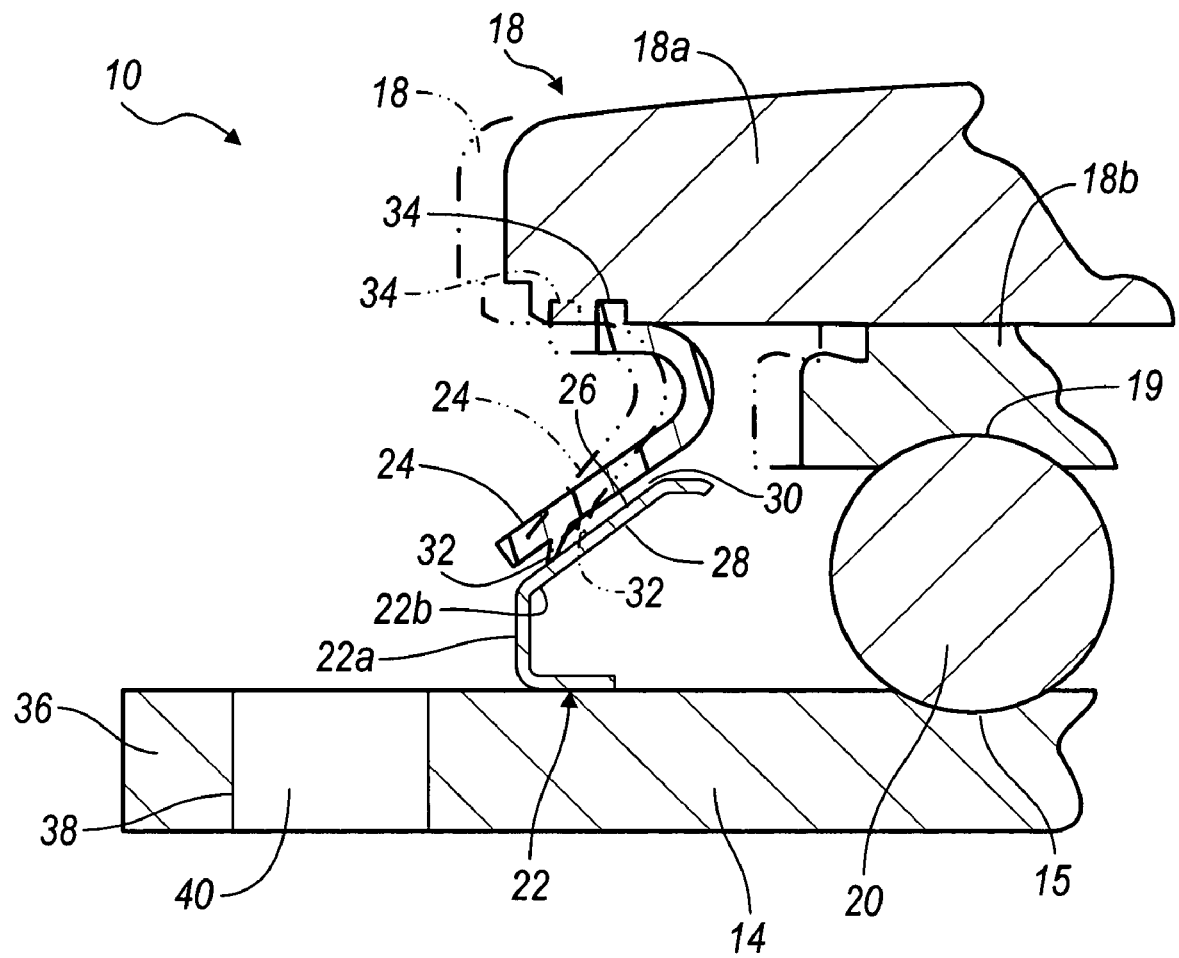
FIG. 4 is a fragmentary cross-sectional view of an alternate embodiment of a bearing assembly and resilient seal element with axial movement of bearing assembly components shown in phantom.

FIG. 4 illustrates movement of a flange element 22 and a resilient seal element 24 relative to each other. Movement can be due to thermal expansion of the entire bearing assembly 10 or thermal expansion of various components of the bearing assembly 10. Likewise, movement can be due to wear of components of the bearing assembly 10. Movement within the bearing assembly 10 can be radial and/or axial; an example of axial movement is depicted in FIG. 4. The flange element 22 is shown coupled to an inner race 14 and the resilient seal element 24 is coupled to the outer race 18 by press-fitting to a receiving channel 34. In the depicted embodiment, the resilient seal element 24 is biased against the flange element 22. As the inner race 14 and outer race 18 move radially with respect to each other, the resilient seal element 24, which is biased against the flange element 22, moves and/or slides along the flange element 22, but maintains contact or a narrow gap 30 with the flange element 22 due to the pliable character of the resilient seal element 24. Consequently, the resilient seal element 24 can maintain an effective seal with the flange element 22 as the bearing assembly 10 expands and/or moves as a result of temperature changes and/or wear.

Alternate embodiments (not shown) can include a bearing assembly 10 and resilient seal element 24 where the location of the flange element 22 and the resilient seal element 24 are reversed relative to the inner race 14 and the outer race 18. For example, a flange element 22 can alternatively be coupled to the outer race 18 of the bearing assembly 10, whereupon the flange element 22 would extend generally in a radial direction toward the inner race 14. Accordingly, the resilient seal element 24 would be coupled to the inner race 14 and would extend generally radially towards the outer race 18 to lie adjacent to the flange element 22. Alternate embodiments also include where the flange element 22 is coupled to the outer race 18 and the seal carrier 44 is coupled to the inner race 14. In these embodiments, the resilient seal element 24 is coupled to the seal carrier 44 and would extend generally radially towards the outer race 18 to lie adjacent to the flange element 22.

Similarly, additional embodiments of a bearing assembly 10 and resilient seal element 24 can further incorporate other structures, auxiliary seals, and end caps that are commonly used in bearing assemblies. For example, such structures include a face seal as described in U.S. Pat. No. 5,704,719 or an end cap as described in U.S. Pat. No. 6,581,939, which are hereby incorporated by reference.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bearing assembly comprising:
an inner race coupled to an inner member;
an outer race coupled to an outer member and positioned such that the inner race is in an opposed and spaced apart relation from the outer race;
a plurality of roller elements disposed between the inner race and the outer race;
a flange element coupled to one of the inner race and the outer race, said flange element extending generally radially toward the other one of the inner race and the outer race; and
a flexible resilient seal element coupled to the other one of the inner race and the outer race, said flexible resilient seal element extending adjacent to the flange element;
wherein the inner member and the outer member are permitted to rotate relative to each other.

2. The bearing assembly of claim 1, wherein the resilient seal element is coupled to the other one of the inner race and the outer race by press-fitting into a receiving channel.

3. The bearing assembly of claim 1, wherein the resilient seal element is coupled to the other one of the inner race and the outer race by ultrasonic welding.

4. The bearing assembly of claim 1, wherein the resilient seal element is coupled to the other one of the inner race and the outer race by adhesive bonding.

5. The bearing assembly of claim 1, wherein the resilient seal element has at least one molded lip seal that contacts the flange element.

6. The bearing assembly of claim 1, wherein coupling the resilient seal element to the other one of the inner race and the outer race creates a biasing force which operates to direct said resilient seal element against the flange element during operation.

7. The bearing assembly of claim 1, further comprising:
a seal carrier extending generally radially toward one of the inner race and the outer race, said seal carrier coupled to the other one of the inner race and the outer race.

8. The bearing assembly of claim 7, wherein the seal carrier is coupled to the other one of the inner race and the outer race by snap-fitting via an inwardly angled lip.

9. The bearing assembly of claim 7, wherein the resilient seal element is coupled to the seal carrier and as such, is coupled to the other one of the inner race and the outer race.

10. The bearing assembly of claim 7, further comprising:
a flexible sealing member coupled to one of the seal carrier and the flange element, said flexible sealing member having at least one sealing leg contacting the ether one of the seal carrier and the flange element.

11. The bearing assembly of claim 7, further comprising:
a felt insert disposed between the seal carrier and the flange element.

12. The bearing assembly of claim 1, wherein the resilient seal element remains adjacent to the flange element during at least one of axial movement and radial movement of the flange element relative to the resilient seal element.

13. A bearing assembly comprising:
an inner race coupled to an inner member;
an outer race coupled to an outer member and positioned such that the inner race is in an opposed and spaced apart relation from the outer race;
a plurality of roller elements disposed between the inner race and the outer race;
a flange element coupled to the inner race, said flange element extending generally radially toward the outer race; and
a flexible resilient seal element coupled to the outer race, said flexible resilient seal element extending adjacent the flange element;
wherein the inner member and the outer member are permitted to rotate relative to each other and the resilient seal element remains adjacent to the flange element during at least one of axial movement and radial movement of the flange element relative to the resilient seal element.

14. The bearing assembly of claim 13, further comprising:
a seal carrier coupled to the outer race, said seal carrier extending generally radially toward the inner race.

15. The bearing assembly of claim 14, wherein the seal carrier is coupled to the outer race by snap-fitting to the outer race via an inwardly angled lip.

16. The bearing assembly of claim 14, wherein the resilient seal element is coupled to the outer race via the seal carrier.

17. The bearing assembly of claim 14, further comprising:

a flexible sealing member coupled to one of the seal carrier and the flange element, said flexible sealing member having at least one sealing leg contacting the other one of the seal carrier and the flange element.

18. A bearing assembly comprising:

an inner race coupled to an inner member;

an outer race coupled to an outer member and positioned such that the inner race is in an opposed and spaced apart relation from the outer race;

a plurality of roller elements disposed between the inner race and the outer race;

a flange element coupled to the inner race, said flange element extending generally radially toward the outer race;

a seal carrier coupled to the outer race, said seal carrier extending generally radially toward the inner race; and a flexible resilient seal element coupled to the seal carrier, said flexible resilient seal element extending adjacent to the flange element;

wherein the inner member and the outer member are permitted to rotate relative to each other and the resilient seal element remains adjacent to the flange element during thermal expansion of the bearing assembly.

19. The bearing assembly of claim 18, further comprising:

a flexible sealing member coupled to one of the seal carrier and the flange element, said flexible sealing member having at least one sealing leg contacting the other one of the seal carrier and the flange element.

20. The bearing assembly of claim 18, wherein the seal carrier is coupled to the outer race by snap-fitting to the outer race via an inwardly angled lip.

21. The bearing assembly of claim 18, wherein the resilient seal element is coupled to the seal carrier by ultrasonic welding.

22. The bearing assembly of claim 18, wherein the resilient seal element is coupled to the seal carrier by adhesive bonding.

23. The bearing assembly of claim 18, wherein the resilient seal element remains adjacent to the flange element during at least one of axial movement and radial movement of the flange elements relative to the resilient seal elements.

24. A bearing assembly comprising:

an inner race coupled to an inner member;

an outer race coupled to an outer member and positioned such that the inner race is in an opposed and spaced apart relation from the outer race;

a plurality of roller elements disposed between the inner race and the outer race; and a seal assembly comprising:

a first rigid element including a snap-fit member coupling said first rigid element with a cooperating snap-fit member on one of the inner race and the outer race, said first rigid element extending generally radially toward the other one of the inner race and the outer race; and a flexible resilient seal element cooperating with the first rigid member in providing a seal to protect an interior of the bearing assembly from an exterior environment.

25. The bearing assembly of claim 24, wherein the resilient seal element cooperates with the first rigid member in providing a seal by being coupled to and extending from the first rigid member, and the first rigid member is a seal carrier.

26. The bearing assembly of claim 24, wherein the resilient seal element cooperates with the first rigid member in providing a seal by extending adjacent the first rigid member and said first rigid member is a flange element.

27. The bearing assembly of claim 24, further comprising:

a second rigid element coupled to the other one of the inner race and the outer race, said second rigid element extending generally radially toward the one of the inner race and the outer race, and the resilient seal element extends adjacent the second rigid element.

28. The bearing assembly of claim 27, wherein the second rigid element is a flange member, and wherein the resilient seal element cooperates with the first rigid member in providing a seal by being coupled to and extending from the first rigid member, and the first rigid member is a seal carrier.

29. The bearing assembly of claim 28, wherein the resilient element is coupled to the seal carrier by ultrasonic welding.

30. The bearing assembly of claim 28, wherein the resilient element is coupled to the seal carrier by adhesive bonding.

31. A bearing assembly comprising:

an inner race coupled to an inner member;

an outer race coupled to an outer member and positioned such that the inner race is in an opposed and spaced apart relation from the outer race;

a plurality of roller elements disposed between the inner race and the outer race;

a flange element coupled to one of the inner race and the outer race, said flange element extending generally radially toward the other one of the inner race and the outer race;

a seal carrier extending generally radially toward one of the inner race and the outer race, said seal carrier coupled to the other one of the inner race and the outer race;

a flexible resilient seal element coupled to the other one of the inner race and the outer race, said flexible resilient seal element extending adjacent to the flange element; and a flexible sealing member coupled to one of the seal carrier and the flange element, said flexible sealing member having at least one sealing leg contacting the other one of the seal carrier and the flange element;

wherein the inner member and the outer member are permitted to rotate relative to each other.

* * * * *

UNITED STATES PATENT AND TRADEMARK OFFICE
CERTIFICATE OF CORRECTION

PATENT NO. : 7,637,665 B2  Page 1 of 1
APPLICATION NO. : 11/480212
DATED : December 29, 2009
INVENTOR(S) : John Cook It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this

Ninth Day of November, 2010

David J. Kappos
*Director of the United States Patent and Trademark Office*